United States Patent [19]

Parulski

[11] Patent Number: 5,295,204
[45] Date of Patent: Mar. 15, 1994

[54] METHOD FOR COLOR BALANCING A COMPUTER INPUT SCANNER INCORPORATING MULTIPLE SCANNING MODES

[75] Inventor: Kenneth A. Parulski, Rochester, N.Y.

[73] Assignee: Eastman Kodak Company, Rochester, N.Y.

[21] Appl. No.: 731,967

[22] Filed: Jul. 18, 1991

[51] Int. Cl.⁵ .................. G06K 9/00; H04N 1/04
[52] U.S. Cl. .................. 382/63; 382/62; 358/479; 358/518; 358/527; 348/223
[58] Field of Search .......... 382/59, 61, 62, 63; 358/27, 29, 29 C, 42, 76, 80, 473, 479, 512, 518, 523, 527

[56] References Cited

U.S. PATENT DOCUMENTS

| | | | |
|---|---|---|---|
| 3,848,856 | 11/1974 | Reeber et al. | 358/76 |
| 3,993,865 | 11/1976 | Browne et al. | 178/7.6 |
| 4,249,197 | 2/1981 | van Spaandock et al. | 358/10 |
| 4,396,940 | 8/1983 | Tanaka et al. | 358/80 |
| 4,581,761 | 4/1986 | Schinokawa et al. | 382/13 |
| 4,591,904 | 5/1986 | Urabe et al. | 358/75 |
| 4,679,067 | 7/1987 | Belmares-Sarabia et al. | 358/29 |
| 4,689,669 | 8/1987 | Hoshino et al. | 358/80 |
| 4,694,329 | 9/1987 | Belmares-Sarabia et al. | 358/22 |
| 4,700,218 | 10/1987 | Thomsen et al. | 358/29 |
| 4,706,108 | 11/1987 | Kumagai et al. | 358/10 |
| 4,710,800 | 12/1987 | Fearing et al. | 358/22 |
| 4,782,384 | 11/1988 | Tucker et al. | 358/22 |
| 4,907,071 | 3/1990 | Belmares-Sarabia et al. | 358/22 |
| 4,931,864 | 6/1990 | Kawamura et al. | 358/80 |
| 4,987,485 | 1/1991 | Hirota | 358/80 |
| 5,144,419 | 9/1992 | Nakatsuka et al. | 358/75 |

*Primary Examiner*—David K. Moore
*Assistant Examiner*—Andrew W. Johns
*Attorney, Agent, or Firm*—David M. Woods

[57] ABSTRACT

A scanner useful as an input device for a computer is operable in two scanning modes: a prescanning mode in which subsampled images are composed and rapidly output to the computer for substantially real-time display, and an input scanning mode in which three successive high resolution color separations are obtained and displayed on a computer screen for color balance. A fixed color image is supported on a movable, hand-manipulated stage that interactively controls the conjugate distances of the optical system so that zooming and cropping is obtained in the prescanning mode without losing focus. The input scanning mode provides color separations useful in evaluating color balance. By defining a window overlying a selected area of the displayed color image containing neutral colors, color balance correction factors are automatically obtained for scanning values within the defined area. The exposure times of each of the color separations are then modified by the correction factors in order to preserve dynamic range in the color balanced image.

9 Claims, 7 Drawing Sheets

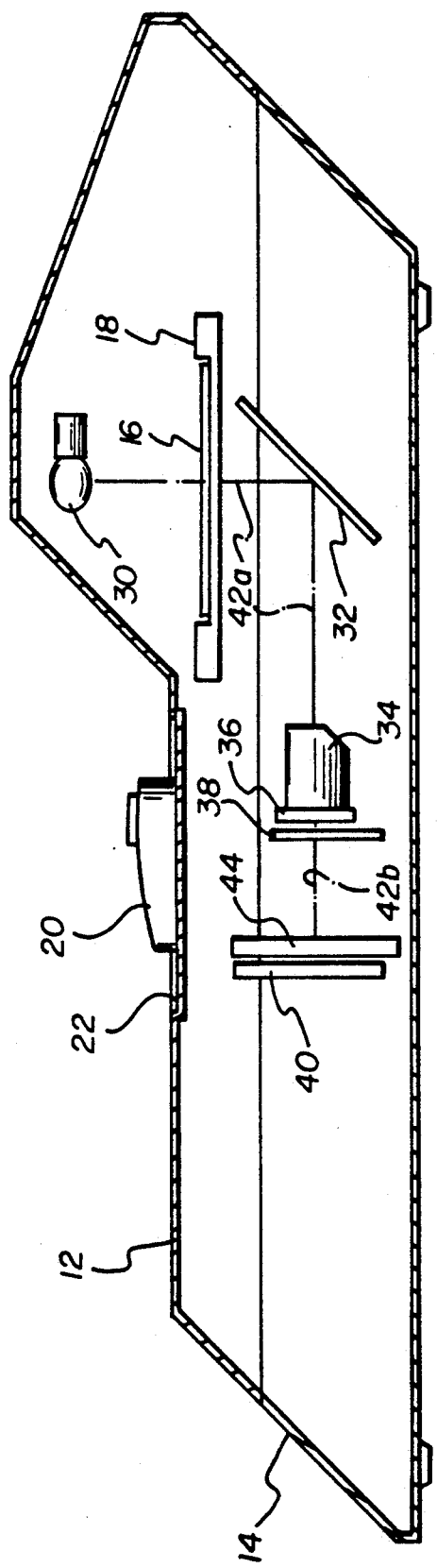
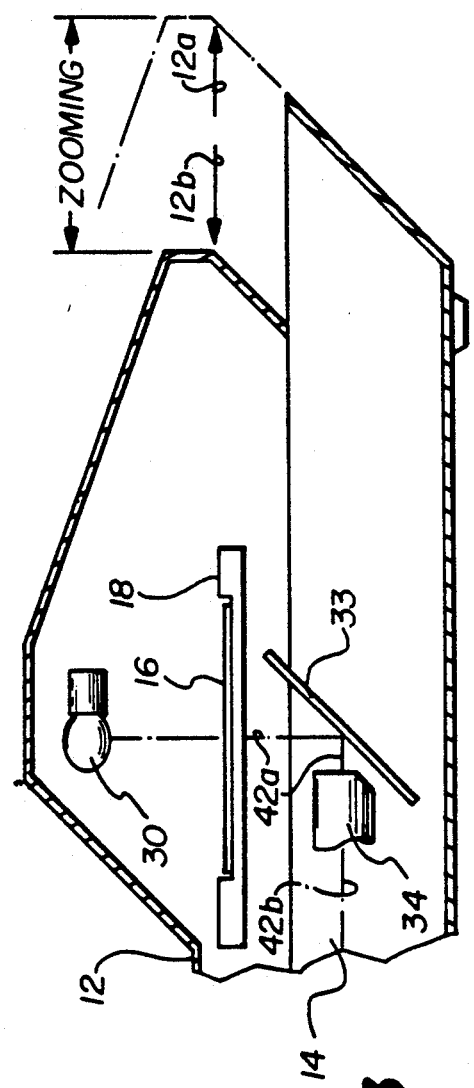
FIG. 2
FIG. 3

(1) COMPOSE IMAGE IN PRESCAN MODE (2) CAPTURE IMAGE IN NORMAL CAPTURE MODE (3) SELECT COLOR BALANCE MODE (4) MOVE WHITE BALANCE WINDOW AND CALCULATE AVERAGE RGB VALUES WITHIN WINDOW (5) RETURN TO NORMAL MODE (1) COMPOSE IMAGE IN PRESCAN MODE (2) CAPTURE IMAGE IN NORMAL CAPTURE MODE (3) SELECT COLOR BALANCE MODE (4) ZOOM AND CROP (5) CALCULATE AVERAGE RGB VALUES WITHIN WINDOW (6) RECOMPOSE IMAGE

METHOD FOR COLOR BALANCING A COMPUTER INPUT SCANNER INCORPORATING MULTIPLE SCANNING MODES

FIELD OF THE INVENTION

This invention pertains to the field of color correction of electronically-generated and displayed images, and, in particular, to the color balancing of a manually operated film scanner used as an input device to a computer.

BACKGROUND ART

Manual image scanners are well known devices for inputting textual and pictorial information to a computer. U.S. Pat. No. 4,581,761 describes a typical ergonomically-designed housing including a linear sensor that is manually dragged by the hand of a human operator (hereinafter referred to as the "user") across the text or pictorial copy. A pressure sensitive switch on the bottom of the scanner turns the unit on when the user forces the scanner against the copy, and turns the unit off when the depression force is removed. Additional functions, such as variation of the enlargement or reduction ratio, may be engaged by keys on the top surface of the scanner. Notwithstanding such functionality, the scanner operates in but one scanning mode, that is, it inputs scanned data when the bottom switch is depressed and the linear sensor is swept across the copy. (U.S. Pat. No. 4,901,364 shows another example of a scanner capable of multi-functional operation, but only one scan capability.) If playback of the scan is needed, e.g., to evaluate the pictorial information, either the computer has to collect the linear scan data for a complete raster, or, as shown in U.S. Pat. No. 3,993,865, an intermediate store is provided for first collecting data from the manual scanner at a variable rate dependent on hand motion and then repetitively reading out the data at a constant rate for television viewing.

It is sometimes desirable to formulate a preliminary scan of the copy material before the final scan is obtained. In copending Ser. No. 732,253, entitled "COMPUTER INPUT SCANNER INCORPORATING MULTIPLE SCANNING MODES", which is assigned to the same assignee as the present application, and filed on even date herewith, a scanner useful as an input device for a computer is designed to operate in two scanning modes: a prescanning mode in which subsampled monochrome images are rapidly output to the computer for substantially real-time composition and display, and an input scanning mode in which three successive high resolution color separations are obtained from the composed image. A fixed image is supported on a movable, hand-manipulated stage that interactively controls the conjugate distances of the optical system so that zooming and cropping is obtained without losing focus. By situating the control buttons for the scanning modes on the movable stage, a single hand can control zooming, cropping, and prescanning without having to interact with a keyboard or like input device to the computer.

Apart from the realm of hand-manipulated scanners, relatively larger desk-top scanners are available for high resolution scanning of slides or negatives in color or black-and white. An example is the 35 mm Rapid Film Scanner manufactured and sold by Eastman Kodak Company, Rochester, N.Y. This scanner performs a color sequential high resolution area scan (1312×1024 pixel area) of color images in 18 seconds for input to a Macintosh ® computer. Besides performing optical zooming, panning, and cropping, the Rapid Film Scanner has a prescan mode in which the image can be viewed either in monochrome or in color. The user selects the mode via a pull-down menu on the computer. Composing the image in color is difficult, however, because of the slow screen update rate due to the need to sequentially capture three color separations by rotating a filter wheel, and due to the color fringes which appear if the film image is moved while the separations are scanned. As a result, image composition is normally done in the monochrome mode. To then capture the image in color, the user must redirect attention to the computer, pull down the computer menu, and select the color mode. Once the color image is stored in the computer, the white balance may be manually adjusted by using a computer mouse to move screen-based "sliders" which control the gains of the red, green, and blue channels. Unfortunately, this adjustment is time-consuming, and may be difficult for the casual user to master.

A simpler technique for setting proper scene color balance, in particular in a video signal including a luminance component, is described in U.S. Pat. No. 4,679,067. The scene images are developed by scanning a motion picture film and displaying the scanned images. An automatic color corrector electrically balances the three primary colors red, green, and blue relative to luminance in a preselected display area or "window" which is less than the full area of a displayed scene. The window can be moved to any part of the displayed picture and changed in size, so that the corrector concentrates upon a specific portion of the picture having a specific color or monochrome content.

In a scanner operable in multiple scanning modes, such as the 35 Rapid Film Scanner or the aforementioned computer input scanner described in copending Ser. No. 732,253, where the image is first composed in monochrome in a prescan operation before final capture in color, it would be desirable to have the color corrector concentrate upon a selected area. However, the interactive nature of an input scanner, particularly a computer input scanner such as described in copending Ser. No. 732,253, would be compromised by simply electrically balancing the red, green, and blue signals as described in the '067 patent. This happens because the dynamic range is affected by electrical adjustments, and the dynamic range of the picture that was prescanned will be different than the dynamic range of the color balanced picture, that is, what was visible in shadow (or highlight) areas of the prescanned picture may be lost in the color balanced picture.

SUMMARY OF THE INVENTION

An object of the invention is to provide a simple, automatic color balance mode in a small, hand-manipulated film scanner that scans images into a host computer so that the user can properly balance the scene color of the image on the host computer's display screen.

Another object is to achieve white balance in a film scanner by allowing the user to indicate a region of the scanned image that should appear neutral (white or grey) and to then automatically adjust the relative exposure levels of the red, green, and blue signals from the scanner so that they produce the same average color value within the indicated region.

Another object of the invention is to provide a hand-manipulated film scanner operable in two modes, one for prescanning images into the host computer for image composition, and the other for capturing the finally composed image in color for the purpose of color balancing and storage in the computer, where the images captured in both modes are substantially matched as to dynamic range.

A color balance method according to the invention is used with a scanner that generates scan values from a sensor sequentially exposed to a fixed color image for a plurality of initial exposure times. The scanner inputs the scan values to a computer for display on screen included therewith. The color balance method includes the steps of:

generating scan values representative of color separations by sequentially exposing the sensor to the fixed color image for respective initial exposure times;

displaying a color image on the screen from the combination of the scan values of the several color separations;

establishing a window overlaying the displayed color image in an area where color balance is to be calculated;

executing color balance calculations upon the scan values within the window in order to generate color correction factors; and generating new exposure times for one or more of the color separations based on the color correction factors.

BRIEF DESCRIPTION OF THE DRAWINGS

The invention will be described in relation to the drawings, in which:

FIG. 2 is a side elevation of the scanner shown in FIG. 1, as simplified to show the main components of the optical system;

FIG. 3 is a partial side elevation of the scanner shown in FIG. 1 further simplified to show zooming movement;

DESCRIPTION OF THE PREFERRED EMBODIMENT

Figure 1:
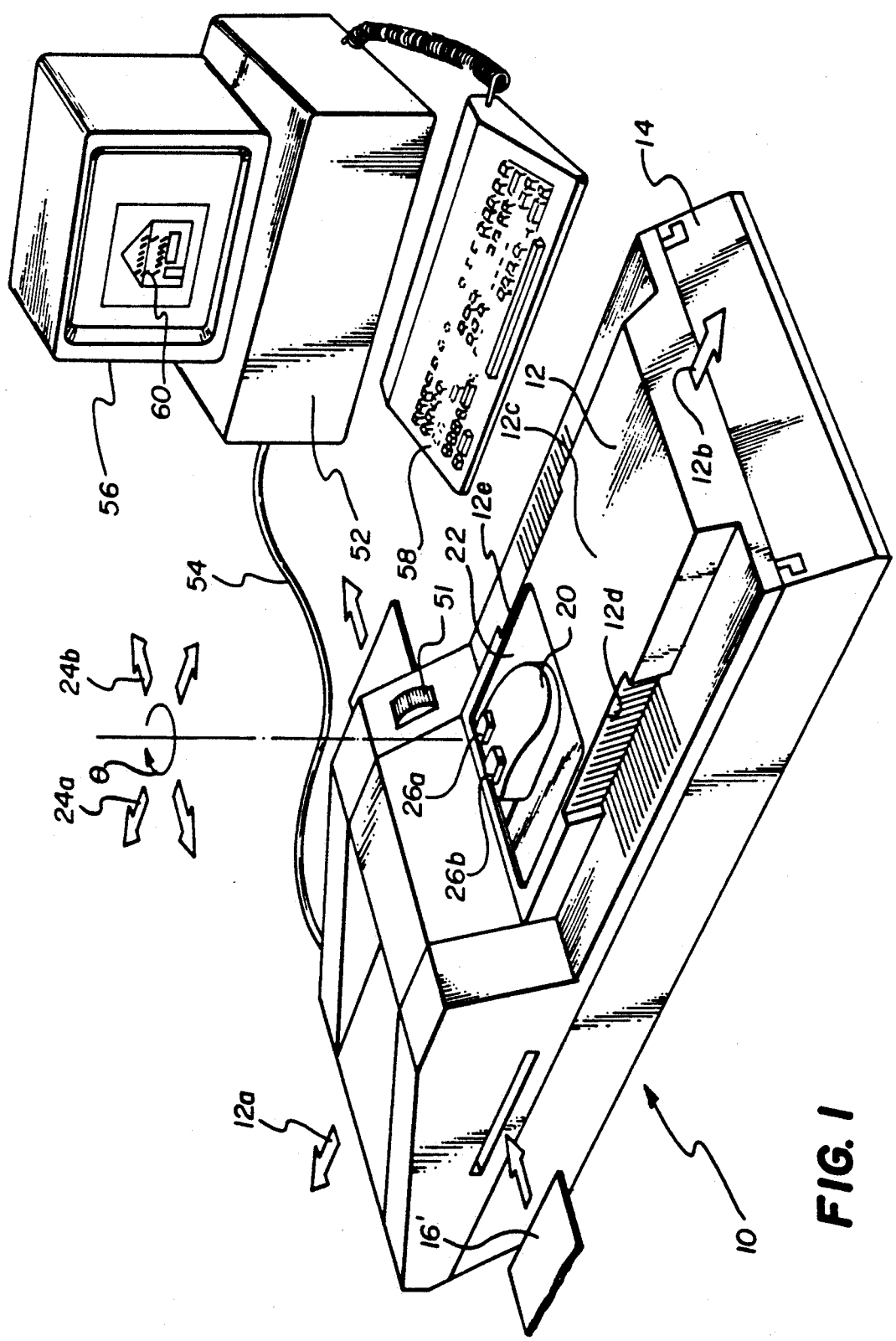
FIG. 1 is a pictorial view of a film scanner connected to a host computer in a configuration allowing for color balance in accordance with the invention.
Figure 4:
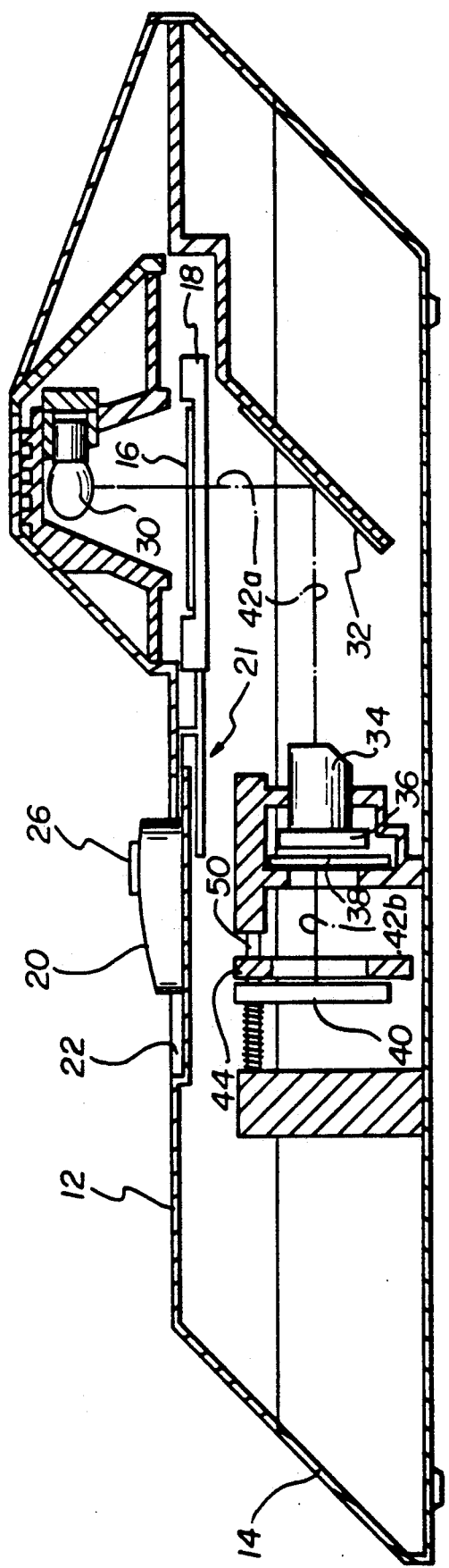
FIG. 4 is a detailed side elevation of the scanner shown in FIG. 1.
Figure 5:
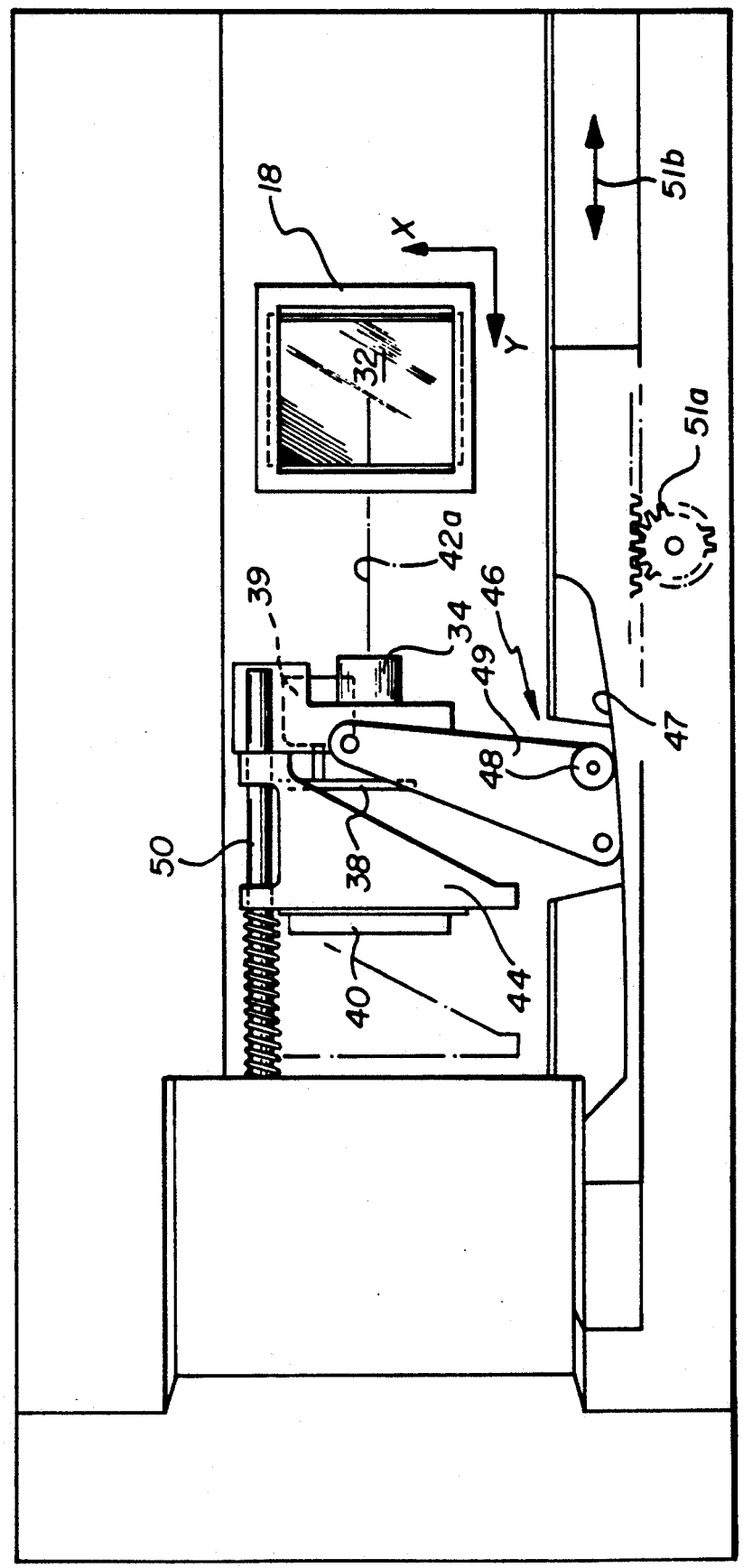
FIG. 5 is a top view of the scanner shown in FIG. 1.

Referring initially to FIGS. 1 through 5, a computer-input film scanner 10 is shown generally as configured in the aforementioned copending Ser. No. 732,253, except for the features pertaining to color balance. The scanner 10 includes an image composition stage 12 constrained to move relative to a housing 14 in the opposed directions depicted by arrows 12a and 12b in FIG. 1. Movement as depicted effects, as will be shown, a zooming operation. The stage 12 and the housing 14 together enclose an optical system (FIGS. 2-5) for scanning a film image 16 on a filmstrip 16', which is internally supported in the optical system on a film carriage 18 (best shown in FIG. 4). The film carriage 18 is interconnected with a hand-manipulated controller 20 that is movable within limits defined by a sunken space 22 on the stage 12. An area under the controller 20 (not shown) is removed to permit interconnection through a lever arrangement 21 (FIG. 4) between the controller 20 and the film carriage 18. Hand-initiated movements of the controller 20 thereby provide x-y translation of the film carriage 18, and the film 16 therewith, as depicted by the arrows 24a, 24b in FIG. 1 (centered over the controller). The lever arrangement 21 can also permit rotary movement of the film carriage 18 by similar rotation of the controller 20 in a $\Theta$ direction. The controller 20 includes at least one button or switch 26a, 26b for initiating scan-related functions, such as prescan, as will subsequently be described.

FIG. 2 shows the elements of the optical system enclosed by the stage 12 and the housing 14, including an illumination source 30, a mirror 32, a fixed focal length lens 34, an electrically-operated mechanical shutter 36, a color filter wheel 38 and an image sensor 40. The mechanical cooperation between the stage 12 and the housing 14 controls the relative position of the optical components. A preferred mechanism for controlling the position of the optical components is disclosed in copending U.S. Ser. No. 659,336, filed on Mar. 7, 1991, entitled "Device for Converting Light Signals into Video Signal", and assigned to the same assignee as the present invention. Ser. No. 659,336 describes a device in which a lens unit, a sensor, and an object are all supported on separate carriages, any two of which are movable with respect to the others along the optical axis of the device. The positions of the movable elements determine the image and object distances for the imaging of a section of the object on the sensor. The two adjustable elements are connected by a cam mechanism such that, when the image and object distances are adjusted by the cam mechanism, the lens images the zoomed section of the object sharply on the sensor. The cam mechanism described in Ser. No. 659,336 is also incorporated in the aforementioned 35 mm Rapid Film Scanner.

In operation, the optical path positions of the conjugate planes in which the film image 16 (object) and the image sensor 40 (image) of the scanner 10 are located are varied in a complementary manner such that the image distance and the object distance are always in compliance with the lens law (1/focal distance=(1/image distance) +(1/object distance)). More specifically, the mirror 32 is fixed to the stage 12 (see FIG. 4), and moves therewith, while the lens 34 is fixed to the housing 14. Movement of the stage 12 therefore varies the length of the optical path 42a (object distance) between the film 16 and the lens 34. The sensor 40, as will be shown, is mounted on a carriage 44 (see FIG. 5) that is interconnected to the stage 12 so that movement of the stage 12 also varies the length of the optical path 42b (image distance) between the lens 34 and the sensor 40. The shape of a cam 47 maintains the lengths of the optical paths 42a, 42b in accordance with the lens law. Thus, the positions of the film 16 and the enclosed image sensor 40 are maintained in their proper conjugate planes with respect to the lens 34 in order to zoom and crop an image of the film 16 without losing focus.

The relationship between the positions of the sensor 40 and the film carriage 18, as taught by Ser. No. 659,336, is provided in the scanner 10 by a zoom-cam mechanism 46, generally shown in FIG. 5 by the cam surface 47 attached to the stage 12 and a cam follower 48 connected by a bracket 49 for moving the sensor carriage 44 with respect to the lens 34 along a spring loaded cylindrical mounting beam 50 which is attached to the housing 14. Movement of the stage 12 in the directions 12a or 12b (FIG. 1) therefore initiates changes in the optical path components 42a and 42b so that focus is maintained while zooming the image. Initial focus is obtained by adjusting a thumb wheel 51 (FIG. 1), which is connected by gearing (not shown) to a pinion 51a (FIG. 5) for racking the cam 47 back and forth in accordance with the arrow 51b until initial focus is obtained. Thereafter the zoom-cam mechanism 46 maintains focus. The maximum extent of movement of the stage 12 relative to the housing 14 in the course of achieving such zooming is shown in FIG. 3. In addition to zooming, the image may be cropped in x-y directions 24a and 24b (FIG. 1) by moving the controller 20 within the sunken space 22 on the surface of the sled 12, and the image may be rotated in a Θ direction by rotating the controller 20. The relative movements of the stage 12 and the controller 20 are provided from one hand by resting the palm on the area 12c of the stage 12 and draping the thumb and little finger over the edge 12d, and 12e while the middle fingers rest over the controller 20. In this manner, pressure from the whole hand moves the stage 12 while the middle fingers independently move the controller 20.

Referring particularly to FIG. 1, the output of the scanner 10 is digitized and fed to a host computer 52 via a digital interface such as a SCSI interface 54. A display screen 56 and a keyboard 58 are connected to the computer 52. Color balance in a particular region of the image is effected by first defining a white balance window 60 in the display screen 56 and then performing a white balance operation upon the color values within the window 60. The window 60 is centered over a particular area that the user determines should appear neutral (white or grey). (It is shown to be in the center of the screen in FIG. 1, but could be anywhere in the screen where neutral colors are found). The white balance operation results in a set of correction factors that are subsequently applied to the color values in at least one of the color separations (red, green, or blue) of the image.

The film scanner 10 is operable in two modes: one mode for prescanning an image, typically to determine the desired compositions, and the other mode for input scanning the finally-composed image in order to perform color balance and to save the balanced image for further processing and use. In the prescan mode, the scanner 10 continuously outputs a spatially-subsampled version of the green record, which is displayed on the computer screen 56 as a monochrome image. In the input scan mode, the scanner 10 inputs first the green, then the red, and finally the blue color separations, and then stops sending data. The prescan mode is initiated by depressing the button 26a. The input scan mode is then initiated by depressing the button 26b, or, alternatively, by simply relieving pressure on the button 26a (in which case, the button 26b is omitted). The controller 20 can also be constructed with the switch 26a on its bottom, so that pressing the controller against the stage 12 closes the switch 26a and initiates the prescan mode. Releasing pressure on the controller 20 would then automatically initiate the input scan mode.

Figure 6:
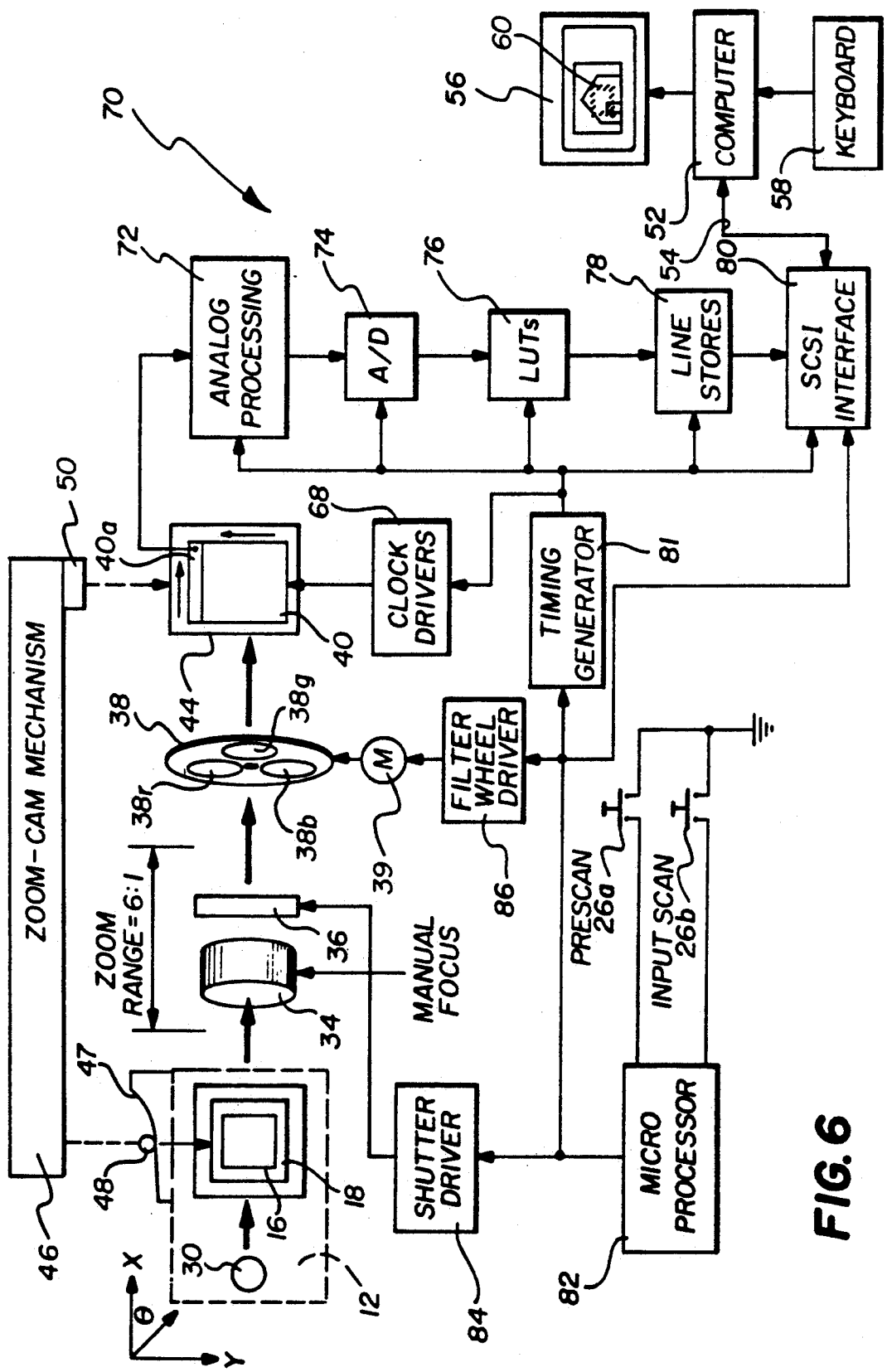
FIG. 6 is a block diagram mainly showing mechanical and electrical components of the film scanner shown in FIG. 1.

Further detail of the scanner 10 circuitry is shown in FIG. 6 in relation to components already described. The optical section of the sensor includes the aforementioned light source 30, the movable stage 12 for supporting the film 16 in the optical paths 42a and 42b, the mechanical shutter 36, the lens 34, the color filter wheel 38 and the full frame image sensor 40 supported in the mounting bracket 44. In accordance with the disclosure of Ser. No. 659,336, the stage 12 includes the cam 47 of the zoom-cam mechanism 46, which in turn is coupled by the cam follower 48 to the mounting bracket 44 of the sensor 40 to maintain proper focus.

For color scanning, the scanner 10 utilizes a color sequential exposure through three color filters 38r, 38g, and 38b mounted on the color filter, wheel 38. For this purpose, a motor 39 (see FIG. 6) drives the color filter wheel 38 so as to place each color filter 38r, 38g, and 38b in the optical path. The film image is focused by the lens 34 through each color filter sequentially, onto the sensor 40, which effectively acts as a sequential monochrome sensor. By rotating the color filter wheel 38 so that the three filters 38r, 38g, 38b are sequentially interposed in the optical path 42a, 42b, a sequence of three color exposures are made upon the sensor 40. The exposure time in each color is regulated by opening and closing the shutter 36 for each exposure. Signals generated by clock drivers 68 drive the image charge line by line to a horizontal register 40a and therefrom to a signal processing section 70.

The signal processing section 70 includes an analog processing circuit 72, an analog-to-digital (A/D) converter 74, a set of look-up tables (LUTs) 76, a set of line stores 78, and a SCSI interface circuit 80. The analog processing circuit 72 provides pre-amplification and conventional correlated double sampling of the analog signals. The analog signals are converted into digital image signals by the A/D converter 74 and applied to the LUTs 76, which contain values to allow for user adjustment of the tone scale (contrast and gamma). The line stores 78 allow buffering of at least one line of data, so that line scanning of the image sensor 40 may be asynchronous with respect to the output of the scanner 10 to the computer 52. The processed signal is then connected via a conventional SCSI digital interface 80 to the computer 52. Timing signals from a timing generator 81 control the processing throughput rate of the signal processing circuit 70, as well as the timing of the clock drivers 68.

The film scanner 10 incorporates a microprocessor 82 that is capable of internal, low-level operations, such as exposure sequencing. For this purpose, the microprocessor 82 controls the shutter 36 via a shutter driver 84, and the color wheel motor 39 via a filter wheel driver 86. Accordingly, the microprocessor 82 enables operation of the scanner 10 in the two principal modes: the prescan mode for rapidly scanning images to the computer 52 without requiring user interaction with the computer keyboard 58 and/or a cursor/pointer on the display 56, and the input scan mode, which is ordinarily much slower than the prescan mode. In order to implement two modes with different scan rates, the scanner is capable of digitizing the film at multiple spatial resolutions, based on the spatial resolution of the sensor 40. A preferred sensor is Kodak Model KAF-0320, which has 512 lines of 768 pixels each. In a scanner using a SCSI interface, such a sensor is capable of producing 512×768 pixel color image data (three image separations) in approximately 10 seconds, or 512×768 pixel monochrome image data (a single image) in approximately 3 seconds.

An update rate of 10 seconds, or even 3 seconds, is too long to provide proper visual feedback to the user to allow the user to easily compose the image by moving controller 20 and stage 12. Therefore, resolution in the prescan mode is reduced by spatial subsampling to 128×192 pixel monochrome image data (one image separation), which allows the scan time to be reduced to less than 200 milliseconds. Prescanning is initiated by depressing the button 26a. The output image to the display 56 can then be updated approximately 5 times per second, so that it appears to the user to be a substantially real-time zoom and crop display. Once the user has composed the image, the button 26b is depressed and the full resolution (512×768 pixels) color image is scanned in three successive scans (10 seconds) and input to the computer 52 for storage and/or processing, as desired. Accordingly, the prescan is obtained at a lowered resolution sufficient for composition (and at a much faster rate) while the final, input scan utilizes the full resolution of the image sensor. The switches 26a and 26b are mounted on the scanner in a place accessible to a single hand of the user, and in particular where they may be actuated without having to resort to the keyboard 58 or to a cursor device on the display screen 56. Preferably, the switches 26a and 26b are mounted on the controller 20 and therefore accessible to the same hand that operates the zoom cam mechanism 46.

The lowered spatial resolution for the prescan mode is accomplished in the vertical direction by clocking several lines, e.g., four lines, out of the sensor 40 for every line read out of the horizontal register 40a, thereby summing the several lines in the horizontal register. Horizontal subsampling is accomplished by running the horizontal clock provided at the clock drivers 68 for the horizontal register 40a at some integral multiple, e.g., four times the frequency, of the clock driving the A/D converter 74. Thus a fewer number of samples are generated for each line and subsampling is accordingly effected. To provide the same signal level to A/D 74 in the prescan mode, the exposure time of the shutter 36 must be decreased (e.g., $\frac{1}{4}$) to compensate for the increased signal due to vertical charge summing.

The full frame sensor 40 and the shutter 36 are used in combination so that long sensor exposure times and the required sensor readout times will not cause a significant increase in noise. Because the shutter 36 must be opened and closed each time an image is captured, it is desirable to minimize the number of times the shutter 36 is activated when scanning the image, particularly in the prescan mode, in order not to wear out the shutter. The shutter 36 must be continually activated when the user is actively composing the image, of course, so that the computer screen 56 displays the updated image as the user "zooms and crops" to compose the image. The screen 566 is updated approximately 5 times per second (300 shutter actuations per minute), so that it appears to the user to be a real-time zoom and crop display. Once the user has completed the composition, however, the RGB color image can be scanned and input using 3 shutter actuations, and the shutter 36 does not need to be opened again until the next image needs to be scanned. The microprocessor 82 is thus programmed to prolong the shutter 36 life by "firing" the shutter only when necessary.

Figure 7:
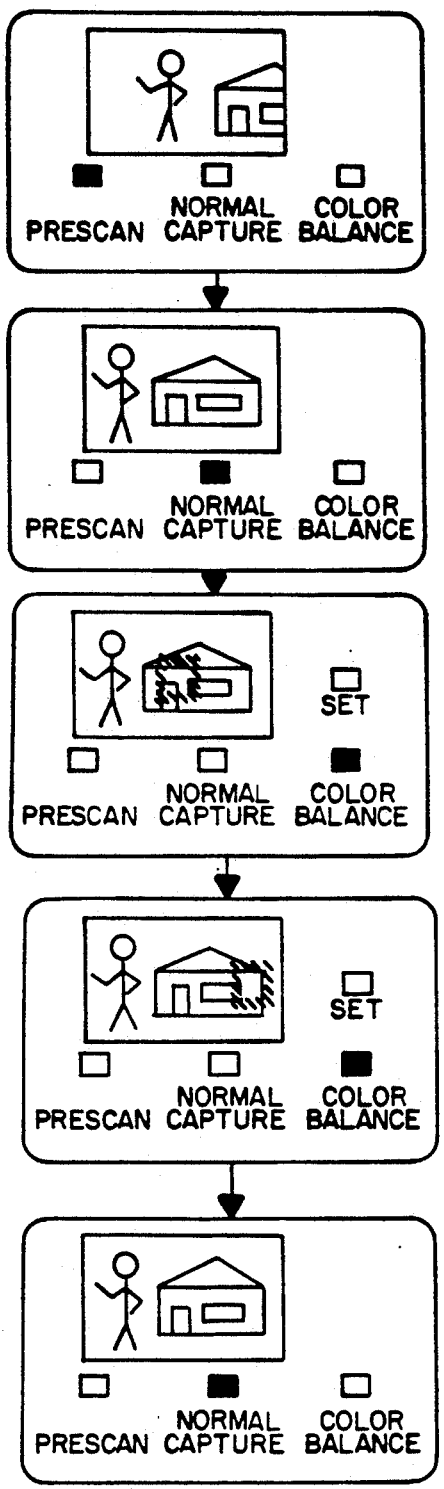
FIG. 7 is a pictorial flow diagram showing elements of the color balance method according to the invention.

The color balance operation initially involves composition of the monochrome image during the prescan mode. The actual white balance procedure is implemented after the RGB color separations are scanned and input to the computer 52 during the input scan mode. User definition of the white balance window is then effected through the computer keyboard 58, or a like input device, such as a computer "mouse". FIG. 7 shows a flowchart of the white balance operation, along with a drawing of the computer screen at each step: (1) The user begins in the prescan mode wherein a monochrome image is displayed on the screen 56 and the stage 12 and the controller 20 are moved until the desired image (person next to a white house) is composed on the screen. (2) The user scans the three color separation records in the input scan (normal color capture) mode into the computer 53. (3) The user asserts the color balance mode, and the computer draws a relatively small rectangle in a preselected portion of the display screen. (4) The user moves the window 60 until a neutral section of the original image (for example the siding of the white house) is within the small rectangle. The users asserts the "set" command and the computer calculates the average red, green, and blue code values using all of the pixels within the rectangular window. After the averages are computed, they are used to compute gain factors for the red and blue signals equal to $G_{ave}/R_{ave}$ for red and $G_{ave}/B_{ave}$ for blue. These gain factors are used to correct either the red and blue signal levels or the red and blue exposure times for all of the pixels of the image. In the preferred embodiment, the exposure times in red and blue are normalized in relation to the green exposure time so that the dynamic range of the white balanced picture is not diminished and, instead, matches the dynamic range of the prescanned picture. (5) Having achieved the desired white balance, the user now captures the image in accordance with the new exposure times.

The gain factors are obtained by the following computations. The image is assumed to be an N×M array of RGB pixel values given by:

$R_{(x,y)}$ = Red value at pixel location x,y,
$G_{(x,y)}$ = Green value at pixel location x, y, and
$B_{(x,y)}$ = Blue value at pixel location x, y.
(where x=0 to N−1 and y=0 to M−1)

The user defines a window of K×J pixels in size starting at location x=a, y=b by drawing a rectangle using a computer mouse pointing device or some other method such as keyboard arrow keys. Alternately, the window can be of fixed size but movable location. After entering the white balance mode from the computer menu by first drawing the rectangle in the image and then clicking on the "set white balance" control, the computer calculates:

$$R_{ave} = \left( \sum_{x=a}^{a+K} \sum_{y=b}^{b+J} R_{(x,y)} \right) / (J*K)$$

$$G_{ave} = \left( \sum_{x=a}^{a+K} \sum_{y=b}^{b+J} G_{(x,y)} \right) / (J*K)$$

-continued $$B_{ave} = \left(\sum_{x=a}^{a+K}\sum_{y=b}^{b+J} B_{(x,y)}\right)/(J*K)$$

To properly white balance the image, the image values $R_{(x,y)}$ are computed by:

$R_{white\ balanced} = R_{(x,y)} * (G_{ave}/R_{ave})$
$G_{white\ balanced} = G_{(x,y)}$
$R_{white\ balanced} = B_{(x,y)} * (G_{ave}/B_{ave})$ Alternately, and preferably when used as part of a film scanner, the three exposure times used to captured the original image given by $R_{time}$
$G_{time}$
$B_{time}$ should be changed to new values given by:

$R_{newtime} = R_{time} * (G_{ave}/R_{ave})$
$G_{newtime} = G_{time}$
$B_{newtime} = B_{time} * (G_{ave}/B_{ave})$ in order to use the proper scanner dynamic range. Referring to FIG. 6, the new exposure times are communicated through the SCSI interface 80 to the microprocessor 82, which accordingly modifies the instructions to the shutter driver 84 for each of the exposure times in the input scan mode.

Figure 8:
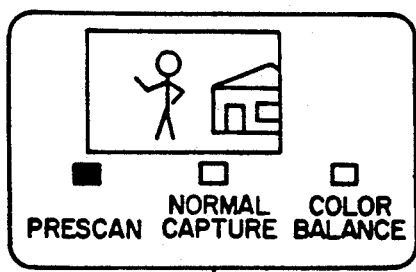
FIG. 8 is a pictorial from diagram of a second embodiment of a color balance method according to the invention.
Figure 8:
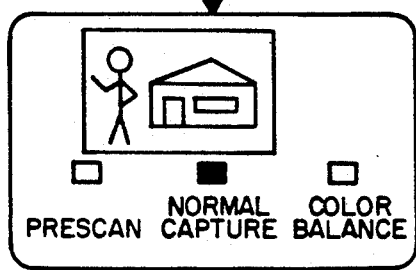
Figure 8:
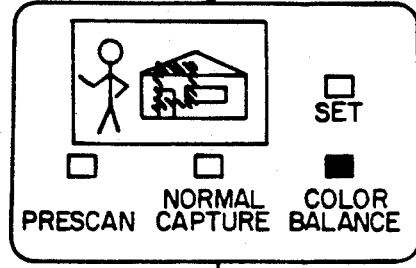
Figure 8:
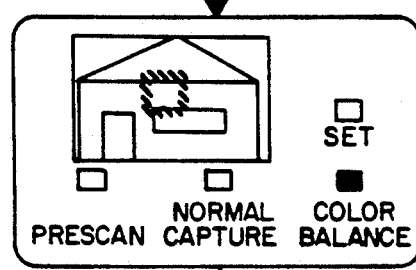
Figure 8:
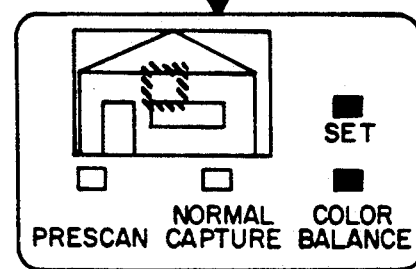
Figure 8:
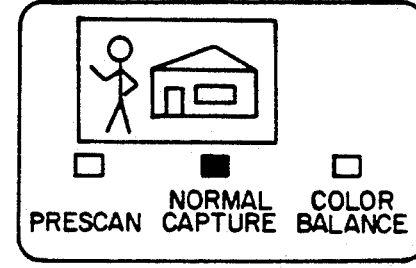

FIG. 8 pictorially describes the flow diagram of a second embodiment in which the white balance window 50 remains fixed in the center of the displayed image, and the image is zoomed and cropped until a neutral section of the image is beneath the window 50. This ordinarily means that the prescan mode is reentered after the color separations are obtained (input scan mode) in order to effect zooming and cropping upon a desired portion of the image. After color balance is completed as described hereinbefore, the input scan mode is reentered in order to get the final scans.

The invention has been described in detail with particular reference to preferred embodiments thereof, but it will be understood that variations and modifications can be effected within the spirit and the scope of the invention.

What is claimed is:

1. A color balance method for use with a scanner that generates scan values from a sensor sequentially exposed to a fixed color image for a plurality of initial exposure times corresponding to a plurality of color separations, the scanner inputting the scan values to a computer for display on a screen included therewith, said color balance method comprising the steps of:

generating scan values representative of color separations by sequentially exposing the sensor to the fixed color image for respective initial exposure times;

displaying a color image on the screen from the combination of the scan values of the several color separations;

establishing a window overlaying the displayed color image in an area where color balance is to be calculated;

executing color balance calculations upon the scan values within the window in order to generate color correction factors;

generating new exposure times for one or more of the color separations based on the color correction factors; and using the new exposure times to generate new scan values from the fixed color image by exposing the sensor to the fixed color image to create new scan values.

2. A color balance method as claimed in claim 1 wherein said step of establishing a window comprises generating a window and moving the window to an area of the displayed color image overlying a combination of colors suitable for the color balance calculations.

3. A color balance method as claimed in claim 2 wherein the combination of colors suitable for the color balance calculations is a neutral color.

4. A color balance method as claimed in claim 1 wherein said step of generating scan values comprises generating red, green, and blue scan values by sequentially exposing the sensor through corresponding red, green, and blue filters for respective red, green, and blue initial exposure times.

5. A color balance method as claimed in claim 4 wherein said step of executing color balance calculations comprises normalizing the scan values of two of the colors with respect to the scan values of the third color, wherein said color correction factors are normalization factors.

6. A color balance method as claimed in claim 5 wherein said step of generating new exposure times comprises applying the normalization factors to the initial exposure times.

7. A scanning method incorporating color balance of the scan values generated by sequentially exposing a sensor to respective colors of a fixed color image for a corresponding sequence of initial exposure times, the scan values being input to a computer for display on a screen included therewith, the fixed color image further being positioned on a stage capable of movement in relation to the sensor to situate different parts of the fixed image on the display screen, said scanning method comprising the steps of:

actuating a prescan mode in which a monochrome image is displayed on the screen of the computer;

moving the stage until a composed image is displayed on the screen of the computer;

actuating a sequential input scan mode in which color separation images of the composed image are generated by the sensor and displayed on the screen of the computer;

establishing a window overlaying an area of the displayed image in which color balance will be calculated;

executing color balance upon the scan values in the window to generate color balance correction factors;

utilizing the color balance correction factors to adjust the exposure times to produce corrected exposure times for one or more of the color separations; and reactivating the sequential input scan mode to generate corrected color separation images from the image sensor by using the corrected exposure times to control the time periods that the sensor is exposed to the fixed color image to create new scan values.

8. A scanning method as claimed in claim 7 in which the step of establishing a window comprises generating a window in a central area of the displayed image and then moving the stage until a neutral area of the displayed image is within the window.

9. A scanning method as claimed in claim 7 in which the step of establishing a window comprises generating a window and moving the window to a neutral area of the displayed image.

* * * * *